United States Patent [19]

Crossland et al.

[11] Patent Number: 5,431,890
[45] Date of Patent: Jul. 11, 1995

[54] CATALYTIC DISTILLATION STRUCTURE

[75] Inventors: Clifford S. Crossland; Gary R. Gildert; Dennis Hearn, all of Houston, Tex.

[73] Assignee: Chemical Research & Licensing Company, Pasadena, Tex.

[21] Appl. No.: 188,803

[22] Filed: Jan. 31, 1994

[51] Int. Cl.$^6$ .............................. B01J 8/02; B01J 8/06; B01J 35/02
[52] U.S. Cl. .............................. 422/211; 203/DIG. 6; 422/191; 422/311; 502/527
[58] Field of Search ............... 422/211, 311, 171, 177, 422/191; 203/DIG. 6; 502/300, 527

[56] References Cited

U.S. PATENT DOCUMENTS

| | | | |
|---|---|---|---|
| 4,242,530 | 12/1980 | Smith, Jr. | 585/510 |
| 4,302,356 | 11/1981 | Smith | 252/456 |
| 4,443,559 | 4/1984 | Smith | 502/527 |
| 4,455,339 | 6/1984 | Meier | 428/185 |
| 4,497,751 | 2/1985 | Pluss | 261/94 |
| 4,497,752 | 2/1985 | Huber | 261/95 |
| 4,497,753 | 2/1985 | Streiff | 261/95 |
| 4,731,229 | 3/1988 | Sperandio | 422/188 |
| 4,744,928 | 5/1988 | Meier | 261/95 |
| 5,073,236 | 12/1991 | Gecbein | 203/29 |
| 5,189,001 | 2/1993 | Johnson | 502/195 |
| 5,266,546 | 11/1993 | Hearn | 502/300 |

FOREIGN PATENT DOCUMENTS

| | | |
|---|---|---|
| 0396650 | 10/1992 | European Pat. Off. . |
| 1186647 | 4/1970 | United Kingdom . |
| 1471442 | 4/1977 | United Kingdom . |
| 1569828 | 6/1980 | United Kingdom . |
| 1604361 | 12/1981 | United Kingdom . |

*Primary Examiner*—Robert J. Warden
*Assistant Examiner*—Robert Carpenter
*Attorney, Agent, or Firm*—Kenneth H. Johnson

[57] ABSTRACT

A bale shaped catalytic distillation structure formed by placing multiple link or continuous tube shaped structures on top of a wire mesh screen, such as demister wire, arrayed at an angle to the longitudinal axis of the bale, such that when the wire mesh screen is rolled up, the rolled structure provides a catalytic distillation structure. The tube comprises flexible, semi-rigid open mesh tubular element filled with a particulate catalytic material, the tube shaped structure having a fastener every 1-12 inches in length to form a multiple link.

12 Claims, 2 Drawing Sheets

CATALYTIC DISTILLATION STRUCTURE

BACKGROUND OF THE INVENTION

1. Field of the Invention

The present invention relates to a structure which can be used in reactions wherein the reaction and distillation of the reaction system are carried on concurrently using the structure as both catalyst for the reaction and as a distillation structure.

2. Related Art

Recently a new method of carrying out catalytic reactions has been developed, wherein the components of the reaction system are concurrently separable by distillation, using the catalyst structures as the distillation structures. This method is now generally known as catalytic distillation and any reference to catalytic distillation herein will be taken to mean this method or process. Such systems are described variously in U.S. Pat. Nos. 4,215,011; 4,232,177; 4,242,530; 4,302,356; 4,307,254; 4,336,407; 4,439,350; 4,443,559; and 4,482,775. U.S. Pat. No. 4,447,668 discloses the dissociation of ethers in a catalytic distillation column. In addition, U.S. Pat. Nos. 4,443,559 and 4,250,052 disclose a variety of catalyst structures for this use.

Sulzer European Pat. No. 0396650 discloses a catalytic distillation structure comprising semirigid mesh like walls containing catalyst material and formed into channels which are layered together such that the flow of the channels cross. Sulzer U.S. Pat. No. 4,731,229 discloses a similar packing. Other Sulzer distillation packings are shown in U.S. Pat. Nos. 4,455,339; 4,497,751; 4,497,752; 4,744,928 and 4,497,735 and UK patents 1,471,442; 1,569,828 and 1,186,647. The present invention provides a catalytic distillation structure for use in reactions, which can be used as a distillation structure. In order to serve both functions, it has been found that the structure must meet three criteria. First, the structure must be such as to provide for even spatial dispersement in the reactor distillation column. That is, the catalyst structures must rest in the column in a geometric arrangement which will perform the desired functions of reaction and distillation sites. To achieve this the structure must be such as to provide fairly uniform spatial distribution in the column.

A second criteria is that there must be sufficient free space in the catalyst bed to allow for the liquid phase surface contact and vapor phase distillation with the concurrent separation of the material in the column by the distillation into vapor and liquid phases. It has been observed that in the catalyst bed a free space of about 50 volume % is adequate to obtain an operable fractionation.

A third criteria is the necessity for the catalyst bed to be able to expand and contract as it must during use without undue attrition of the catalyst.

The present invention meets all of the criteria is a superior manner.

SUMMARY OF THE INVENTION

Briefly the present invention is a catalytic distillation structure comprising at least one plurality of flexible, semi-rigid open mesh tubular elements filled with a particulate catalytic material (catalyst component) and sealed at both ends, intimately associated with and supported by a wire mesh screen coiled into a spiral having a longitudinal axis, said tubular element being arrayed at an angle to the longitudinal axis thereby forming a bale.

The flexible, semi-rigid open mesh tubular element filled with a particulate catalytic material preferably has a fastener every 1–12 inches along the length of the tube to form a multiple link shaped catalytic distillation structure. The links formed by the fasteners may be evenly or irregularly spaced.

The bale shaped catalytic distillation structures are formed by placing at least one tubular element on top of the wire mesh screen, such as demister wire, in a diagonal array, such that when the wire mesh screen is rolled up, the rolled structure provides a new and improved catalytic distillation structure. Further embodiments include multiple stack arrangements of alternating wire screen mesh and tubular elements that are rolled into a new bale shaped catalytic distillation structure. The tubular elements on alternating layers are preferably arrayed on the wire mesh screen in opposite directions such that their paths cross. Each tubular element will define a spiral within the bale.

The catalyst component may take several forms. In the case of particulate catalytic material, generally from 60 mm to about 1 mm down through powders, is enclosed in a porous container such as screen wire, or polymeric mesh. The material used to make the container must be inert to the reactants and conditions in the reaction system. The screen wire may be aluminum, steel, stainless steel, and the like. The polymer mesh may be nylon, teflon, or the like. The mesh or threads per inch of the material used to make the container is such that the catalyst is retained therein and will not pass through the openings in the material. Although the catalyst particles of about 0.15 mm size or powders may be used and particles up to about ¼ inch diameter may be employed in the containers.

Each catalytic distillation structure containing a solid catalytic material comprises a catalyst component, preferably comprising a resilient material which is comprised of at least 70 volume % open space up to about 95 volume % open space. The total volume of open space for the catalytic distillation structure should be at least 10 volume % and preferable at least 20 volume % up to about 65 volume %. Thus, desirably the resilient material should comprise about 30 volume % to 70 volume %. One suitable such material is open mesh knitted stainless wire, known generally as demister wire or an expanded wire or an expanded aluminum. Other resilient components may be similar open mesh knitted polymeric filaments of nylon, Teflon and the like.

The present tubular shaped container may be composed of a wire mesh tube that has been closed by flattening the tube together at one end with a fastener such as staples or other appropriate means such as crimping, welds, or sewn metal, etc. The tube container is then filled with the appropriate catalyst material. The second end of the wire mesh tube is closed in a like manner as the first end, so that the axis of the second closed end is in the same plane as the first closed end. This process may be repeated several times to obtain multiple tubular links filled with a catalyst material.

DETAILED DESCRIPTION AND PREFERRED EMBODIMENTS

Figure 6:
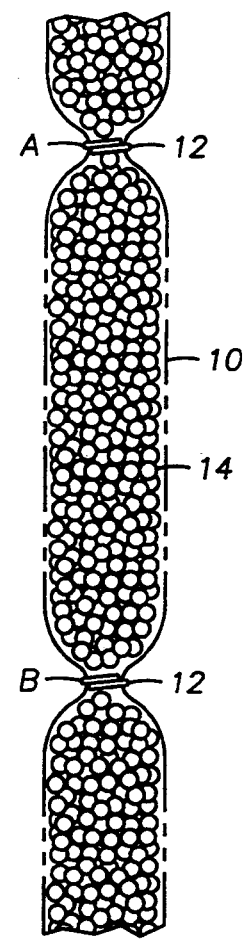
FIG. 6 shows a tubular element.

Referring to FIG. 6, a wire mesh tube 10 is closed at one point A with a fastener 12, which may be wire, crimping, welds, or sewn metal. The wire mesh tube 10 is then filled with a catalyst component 14 and the second point B is closed by a fastener 12. This filling procedure is repeated several times until the desired number of links are obtained.

Figure 1:
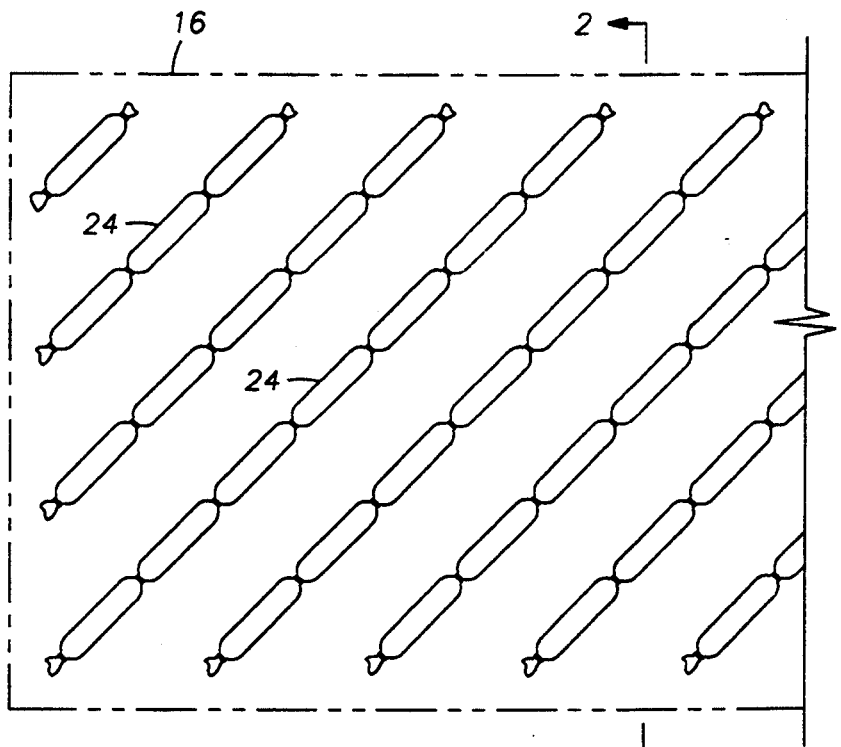
FIG. 1 shows one embodiment of the present invention comprising multiple link catalyst distillation structures arrayed on a wire mesh screen.
Figure 2:
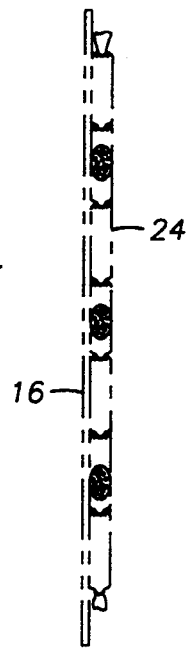
FIG. 2 is a side view of the catalytic distillation structure shown in FIG. 1 along line 2—2.
Figure 5:
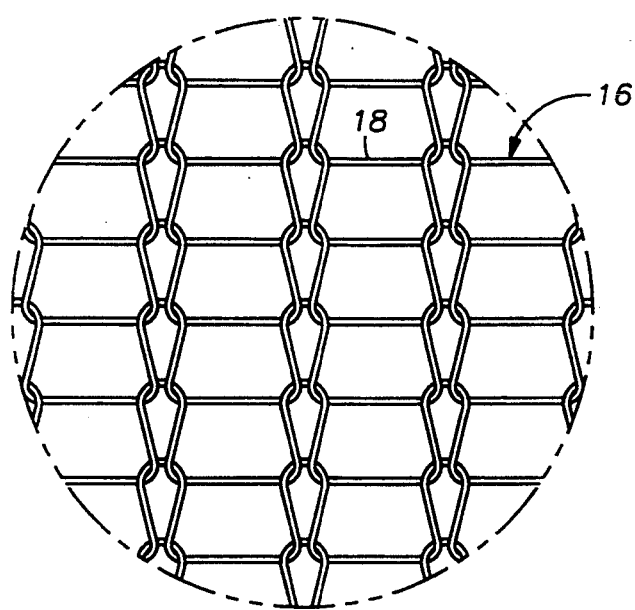
FIG. 5 is a close-up view of the sheet of woven wire mesh used in the present invention.
Figure 7:
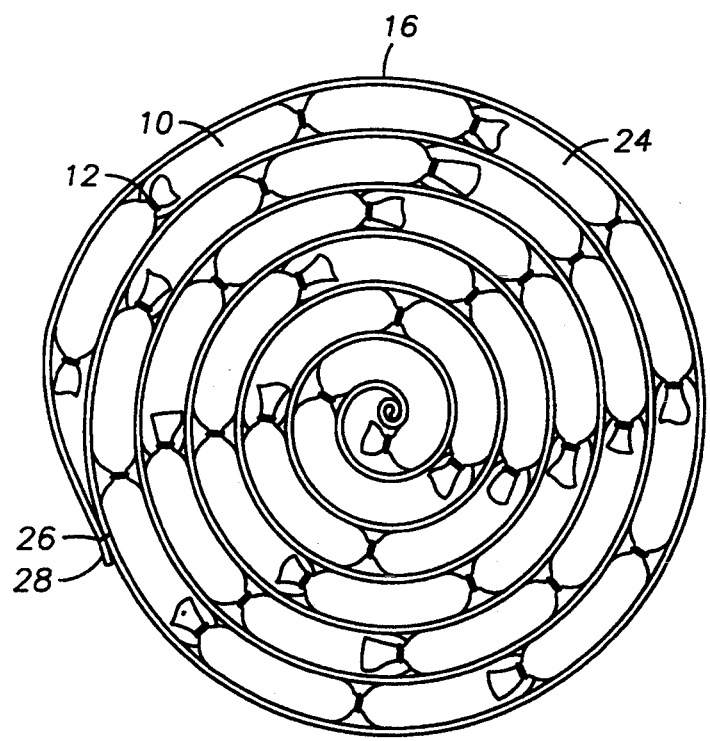
FIG. 7 is a top view of the structure shown in FIG. 1, that has been rolled up to form a bale shaped catalytic distillation structure.
Figure 8:
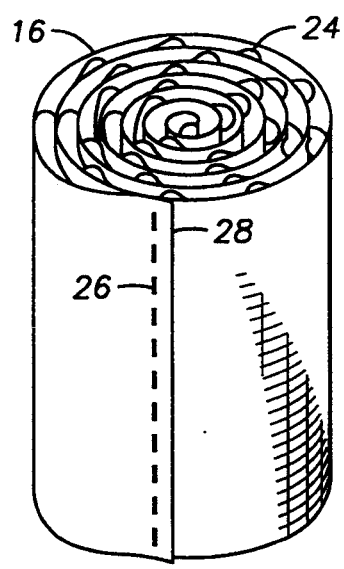
FIG. 8 is a perspective view of the catalytic distillation structure shown in FIG. 7.

In FIG. 1, the link structure 24 is placed on top of a sheet of demister wire 16. The demister wire 16 can be of any size, thickness, or design, desired to obtain an efficient catalytic distillation. FIG. 5 shows a close-up view of a typical demister wire 16 having interconnected wires 18 to form a wire mesh. Referring to FIG. 1, the link structures 24 are placed on top of the rectangular sheet of demister wire 16, diagonally along the length of the sheet of demister wire 16. The continuous and link tubular elements may be intermixed or all of the tubes in a layer or catalytic distillation structure may be either type. The invention is illustrated with the preferred link type tubes, however the continuous tubes although not specifically shown are exactly the same as the tubular elements 22 and 24 with the fasteners 12 omitted. The sheet of demister wire 16 is then rolled lengthwise and stapled or otherwise attached to the adjacent portion of the screen along the free edge 28 by staples 26 to create a bale shaped catalytic structure as shown in FIGS. 7 and 8. Although not shown the tubular element may be attach, for example by staples to the wire screen in order to facilitate manufacture and to insure that the tubes will stay in place throughout their use.

In FIG. 7 the end of each row of tubular elements 24 is visible. In FIG. 8 the completed bale is shown in perspective view.

Figure 3:
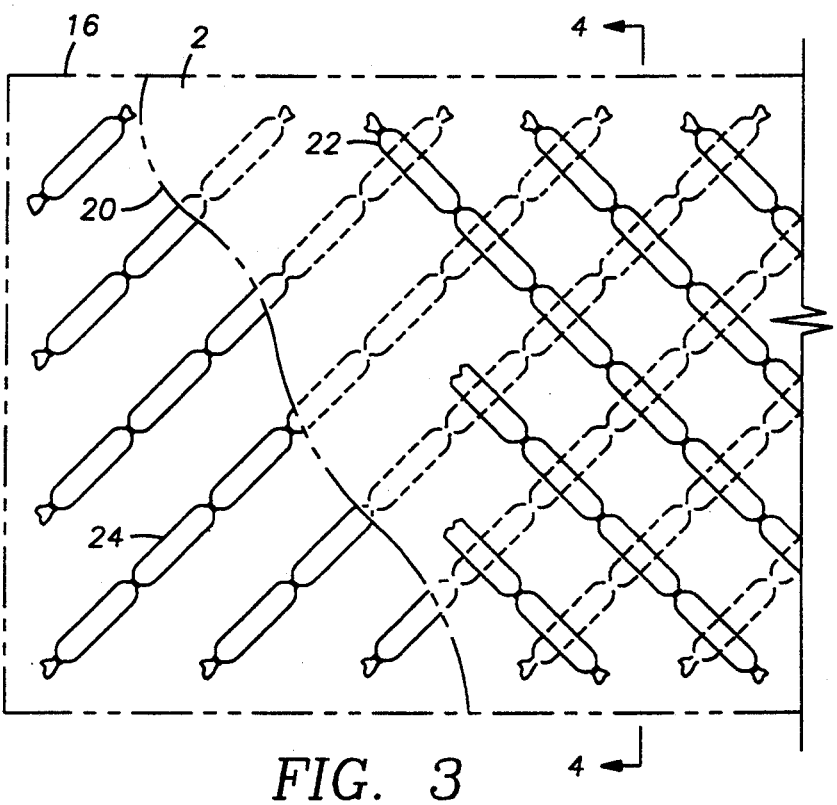
FIG. 3 shows an alternative embodiment of the present invention comprising a stack arrangement.
Figure 4:
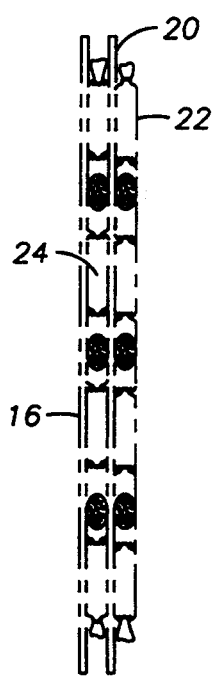
FIG. 4 is a side view of the catalytic distillation structure shown in FIG. 3 along line 4—4.

FIG. 3 shows an alternative embodiment of the present invention. A second sheet of demister wire 20 is placed on top of the structure found in FIG. 1, with the multiple link tubular elements 22 placed on top of the first sheet of demister wire 20, in diagonally opposite rows to the tubular elements 24 found on the sheet of demister wire 16.

The two sheets of demister wire 16, 20, are then rolled together lengthwise toward the inside to create a bale shaped catalytic structure of the same type as shown in FIGS. 7 and 8. The internal placement of the multiple link structures form a spiral arrangement in the bale. Multiple stacks, having different configurations, may be rolled to create any desired bale configuration.

The continuous tube shaped catalytic distillation structure may be used interchangeably in the same manner as the multiple link shaped structure to create new bale shaped catalytic distillation structures.

The bale shaped structures found in FIGS. 7 and 8 are ready for insertion into a column suitable for catalytic distillation.

The bale shaped catalytic distillation structures may be configured in any order within the catalytic distillation column to achieve the results desired.

In the place of the wire mesh, equivalent materials made from polymers may be used. In place of staples or sewn seams, adhesives may be used, with the only proviso being that the materials employed withstand attack by the materials and conditions in the reactor distillation column.

The size of catalyst components and the relative amount of the resilient component associated therewith or surrounding the catalyst components will determine the open space in the bed, which should be at least about 10 volume % and preferably at least 20 volume %. In the case of longer beds, it may be desirable to have a larger open space, thus a larger volume of the resilient material compared to the catalyst component would be employed.

Although the present catalytic distillation structures are especially useful for a process where there is a concurrent reaction distillation, it is also very useful for vapor phase reactions, since the catalyst bed prepared from the present structure provides a very low pressure drop therethrough.

The catalytic material may be any material, appropriate for the reaction at hand, that is, it may be an acid catalyst or a basic catalyst or others such as catalytic metals and their oxides or halides, suitable for a multitude of catalytic reactions and, of course, heterogeneous with the reaction or other fluids in the system. Some specific reactions are:

| CATALYST | REACTION |
| --- | --- |
| Acid cation exchange resins | dimerization, polymerization, etherification, esterification, isomerization, alkylation |
| Magnesia, chomia, brucite | isomerization |
| Molecular sieves (synthetic alumino-silicates) | dimerization, polymerization, alkylation, isomerization, selective hydrogenation, dehydrogenation |
| Cobalt thoria | Fisher-Tropsch process |
| Cobalt molybdate | hydrofining |

The material for forming the tubular container may be the wire mesh materials, such as stainless steel, expanded aluminum, or the like. Suitable adhesives such as epoxys or various of the hot melt adhesives which are not softened at the temperatures of use or attacked by the reactants or products may be used to join both polymeric materials and wire into the appropriate configuration. Similarly staples, brads or other fastening means may by used. The wire may be sealed by welding. In a similar fashion, seals may be obtained with laser welding on the meltable materials.

The catalytic distillation structure may be individually and randomly placed into a reactor distillation column or arranged in specific patterns or groupings. Moreover, any catalyst bed may be a mixture of various shapes and sizes of the present catalytic distillation structures.

The invention claimed is:

1. A catalytic distillation structure comprising a first plurality of flexible, semi-rigid open mesh tubular elements filled with a particulate catalytic material, sealed at both ends, supported by a wire mesh screen coiled into a spiral having a longitudinal axis, said tubular elements being arrayed at an angle to the longitudinal axis.

2. The catalytic distillation structure according to claim 1 further comprising multiple seams along the axis of the tubular element to create a multiple link catalytic distillation structure.

3. The catalytic distillation structure according to claim 1 wherein said tubular element comprises a resilient component of up to about 95 volume % open space.

4. The catalytic distillation structure according to claim 1 wherein said resilient component comprises 30 to 70 volume % of said catalytic distillation structure.

5. The catalytic distillation structure according to claim 1 wherein said tubular element is selected from the group consisting of polymeric mesh, wire mesh, stainless steel screen wire and aluminum screen wire.

6. The catalytic distillation structure according to claim 4 wherein said catalytic material particle size is in the range of from about 0.15 mm to about ¼ inch.

7. The catalytic distillation structure according to claim 4 wherein the particle size is in the range of from about 0.25 mm to 1 mm.

8. The catalytic distillation structure according to claim 1 containing from about 10 to 65 volume % open space.

9. The catalytic distillation structure according to claim 1 wherein the mesh openings in said tubular element are smaller than the diameter of particles of catalyst.

10. The catalytic distillation structure according to claim 1 wherein a second plurality of flexible, semi-rigid open mesh tubular elements filled with a particulate catalytic material, sealed at both ends, intimately associated with and supported by a second wire mesh screen positioned on the first tubular elements, said second tubular elements being arrayed at an angle to the longitudinal axis and opposite to the first plurality of tubular elements.

11. A catalytic distillation structure comprising:
a first stack having a sheet of wire mesh screen with at least one multiple link tubular element containing particulate catalytic material placed on top of said screen in a diagonal direction;
a second stack having a second sheet of wire mesh screen with at least one multiple link tubular element containing particulate catalytic material placed on top of said second screen in a diagonal direction;
wherein said second stack is placed upon said first stack such that the at least one tubular element of the second stack is perpendicular to the at least one tubular element of the first stack, and the first and second stack are rolled to form a bale.

12. A catalytic distillation structure comprising:
a first stack having a sheet of wire mesh screen with at least one continuous tubular element containing particulate catalytic material placed on top of said screen in a diagonal direction;
a second stack having a second sheet of wire mesh screen with at least one continuous tubular element containing particulate catalytic material placed on top of said second screen in a diagonal direction;
wherein said second stack is placed upon said first stack such that the at least one tubular element of the second stack is perpendicular to the at least one tubular element of the first stack, and said first and second stack are rolled to form a bale.

* * * * *